July 17, 1934. L. J. BURKE Re. 19,238

EDUCATIONAL AND DISPLAY DEVICE

Original Filed Sept. 24, 1931 2 Sheets-Sheet 1

Inventor:
Lawrence J. Burke
By: Cox & Moore
Attys

July 17, 1934.

L. J. BURKE

Re. 19,238

EDUCATIONAL AND DISPLAY DEVICE

Original Filed Sept. 24, 1931 2 Sheets-Sheet 2

Inventor:
Lawrence J. Burke
By:- Cox & Moore Attys.

Reissued July 17, 1934

Re. 19,238

UNITED STATES PATENT OFFICE 19,238

EDUCATIONAL AND DISPLAY DEVICE

Lawrence J. Burke, Chicago, Ill., assignor to Poster Products Inc., Chicago, Ill., a corporation of Illinois Original No. 1,922,229, dated August 15, 1933, Serial No. 564,828, September 24, 1931. Application for reissue February 26, 1934, Serial No. 713,066

14 Claims. (Cl. 35—12)

This invention relates to an educational and display device or the like comprising and employing a novel means of removably holding pieces or segments of preferably vari-colored material on a background of a substantially similar material having a hairy surface. This device is very satisfactorily adaptable for kindergarten and for entertainment and education of children. It may also be used in removably attaching letters in spelling boards and in advertising display signs and other displays.

An object of my invention is the provision of a device which is educational and entertaining to children and which teaches them the shapes of various objects as well as the alphabet, figures, pictures and the skill of differentiating and combining various colors and designs.

A further object of my invention is the provision of a means which may be very satisfactorily employed in art and display work such as advertising displays and signs and in which the background and letters are made of a material having extending hairy surface tentacles, the adjacent or abutting hairy tentacles of the designs or letters inter-engaging with each other and with like surface tentacles of the background to hold the same in position while permitting removal without injury or destruction of the designs and letters from the background.

Other and further important objects of this invention will be apparent from the disclosures in the specification and the accompanying drawings.

This invention (in preferred forms) is illustrated in the drawings and hereinafter more fully described.

Figure 1:
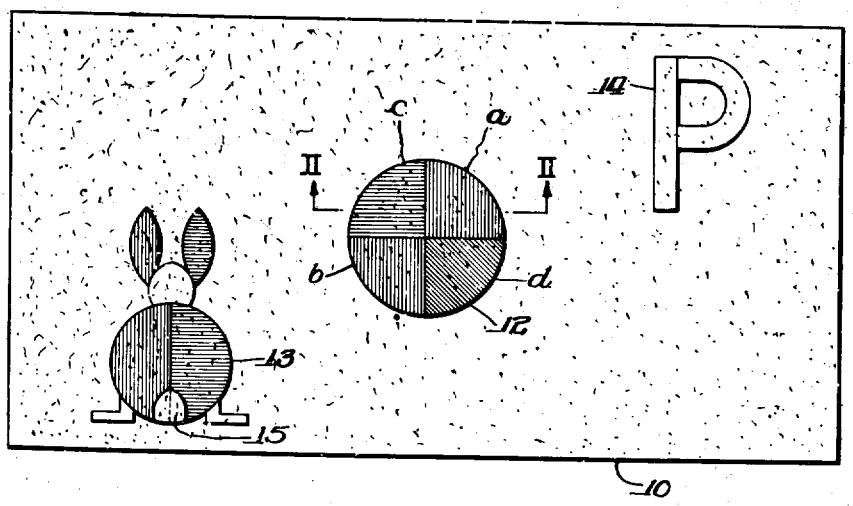
Fig. 1 shows a top plan view of a portion of my device showing a hair-surfaced base member with several hair-surfaced object representations thereon.
Figure 2:
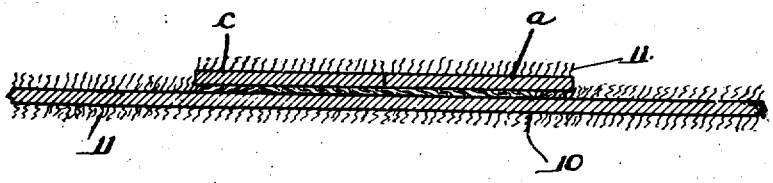
Fig. 2 is a cross-sectional view taken on the line II—II of Fig. 1.

In Figs. 1 and 2 the reference numeral 10 indicates a flexible base member which has a multiplicity of hairy tentacles protruding above the surface of said base member. The base member 10 may be made of certain grades of felt material which has numerous hairy members or tentacles protruding outwardly from either one or both flat sides. Such felt may be made more satisfactory for the purpose of my invention by brushing the same with a brush to cause a greater number of the hairy members and tentacles to project from the felt surface, and said projecting tentacles may be made stiffer by a thin application of a hot liquid solution containing paraffine or other solidifying or partially solidifying material.

The base 10 may be of any size or shape desirable, but in my preferred form shown in Fig. 1 I have shown it rectangular as this is most desirable for use in a device and is conveniently packed in a box.

My device includes a large number of cut-out pieces of hair-surfaced felt of varied designs, shapes and colors, the sectors being of such shape as to form pictures, numbers and letters of the alphabet and representations of various objects known to children when assembled. The reference numeral 12 represents a plurality of felt sectors assembled together to represent a ball.

Numeral 13 represents a rabbit and comprises a number of assembled sectors each of a different color as indicated.

Numeral 14 represents the letter P, which in this instance comprises two assembled sectors.

Each device includes a number of hair-surfaced cut-outs of various geometric shapes particularly known to children; for example, circles, semi-circles, triangles, squares, etc., which permit assembly by the child to form various pictures and object representations. As previously stated, and as shown more particularly in Fig. 2, the cut-outs such as *a* and *c* (Fig. 2) are constructed of hair-surfaced material substantially similar to that from which the base member 10 is constructed. The hairy members or tentacles 11 project from both sides of the cut-outs, as shown. In playing, the child will first spread out base member 10, then select the desired hair-surfaced sectors and assemble them by placing each one into its proper position to gradually build up the image of the object or picture in mind, which image may be suggested by pictures or actual objects. When the hair-surfaced sectors are placed on the base member 10, the tentacles of the member 10 and the sectors will entangle and inter-engage to cause said sectors and consequently the representations which they comprise to be held with fair degree of firmness together and on said base member. As will be seen from the drawings, the various sectors may be juxtaposed on the base member with adjacent edges in engagement so that there will be no substantial physical line of demarcation between them, the sectors being sufficiently pliable so that their edges will conform to any slight irregularities in the engaging edges of adjacent sectors. The hairy tentacles on the edges of engaging sectors inter-engage with each other tending to hold the sectors together. Inasmuch as the sectors have hairy tentacles on both sides it will be seen that sectors may be frictionally secured upon each other, as shown more particularly at 15 in the rabbit design 13 of Fig. 1. In such cases the hairy tentacles of the sectors inter-engage to hold the upper section in position. Superimposition of sectors permits the construction of designs of contrasting thickness as well as of contrasting color.

Figure 3:
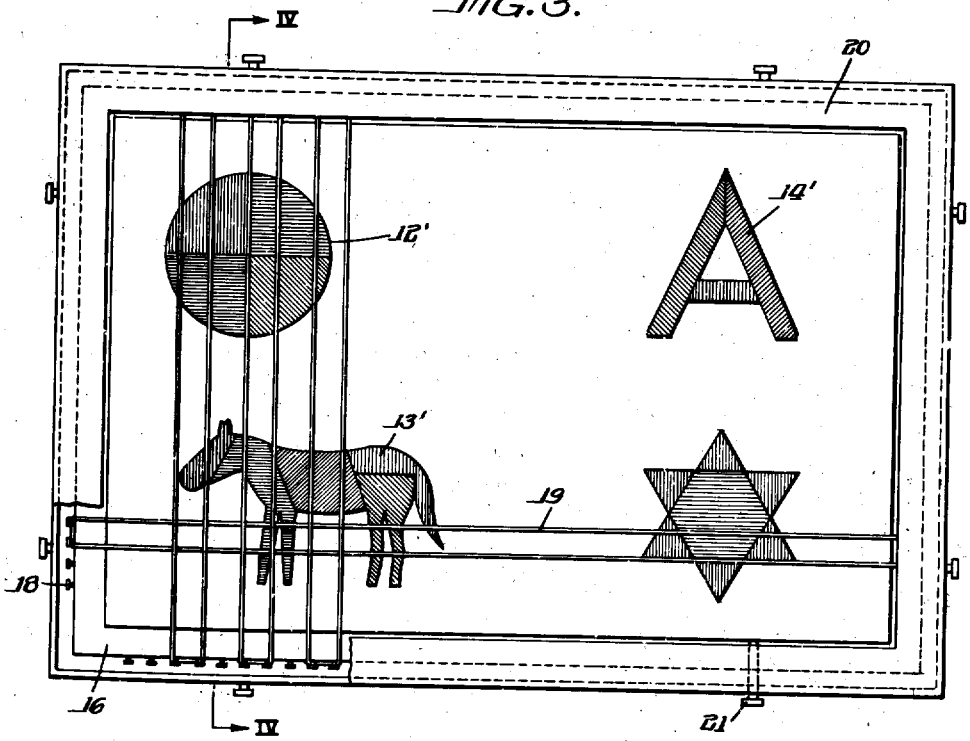
Fig. 3 shows a top plan view of a convex background or base member having pictorial or object representations thereon, said pictorial and object representations comprising a plurality of assembled vari-colored sectors.
Figure 4:
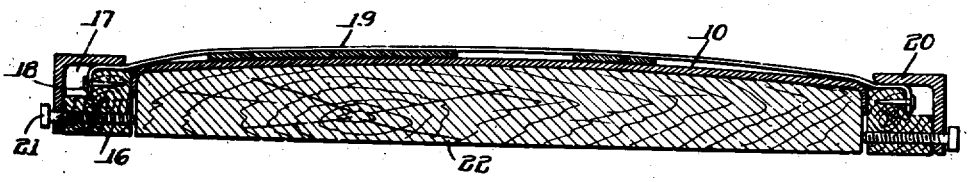
Fig. 4 is a cross-sectional view on line IV—IV of Fig. 3.

The modified form of my invention shown in Figs. 3 and 4, which I will now describe, comprises additional means to hold the hair-surfaced sectors comprising pictorial or design representations formed on the hair-surfaced base in place when the child desires to keep same intact during active handling in play and as long as desired. A felt base member 10′ is secured on the convex upper surface of the base 22 which is preferably of wood and rectangular in shape. The base member 10′ is similar to member 10.

Designs such as 12′, 13′ and 14′ are secured to the base member 10′ as in Figs. 1 and 2.

A frame 16, which may be made of four pieces of wood jointed and secured together at their ends, as shown, is made of a size adapted to slip over the base 22 and its attached parts as herein described. The frame 16 is preferably recessed to form an outer groove 17 as clearly shown in Fig. 2. Short nails 18 are horizontally driven into the frame 16 at regularly spaced intervals in a manner so that the extending head portion of each of the nails 18 is within the groove 17, as shown in Figs. 1 and 2.

Elastic bands 19 may be hooked about nails 18 on opposite sides of the base 22 as shown in Fig. 1 and in a manner so that the bands connecting opposite sides of the base 22 are substantially perpendicular to each other. The bands 19 may be of rubber, thread, or netting having some degree of elasticity.

A rectangular metal frame member 20 comprising four members L-shaped in cross section joined to form a rectangle and of a size adapted to fit over the frame 16, is removably mounted over the frame 16 so that the inner edge thereof will engage the bands 19 to hold said bands adjacent the upper surface of the frame as shown in Fig. 2. It will be apparent that the bands may be tightened by merely pushing the frame as far as possible about the base 22. The frame 16 and metal frame 20 have a plurality of horizontal apertures therethrough on two opposite sides thereof, said apertures through the metal frame 20 being threaded from the reception of thumb screws 21 which have knurled heads and rounded ends which are adapted to engage the edge of the base 22 to hold the frames 16 and 20 in a position to maintain the bands 19 taut and in contact with the pictorial or design representations assembled on the hair-surfaced member 10′.

It is only necessary to remove the frames 16 and 20 with their bands 19 from the base member 22 when the child desires to assemble new designs which it may again preserve by again placing the frames 16 and 20 with said bands in a manner herein described.

This is highly desirable as the sectors or the representation which a number of assembled sectors comprise will not move easily nor fall off in ordinary handling, but will remain until pulled apart manually. This highly important removable connection between representations or letters and the base or background is novel and cannot be attained by the use of paper or other substantially smooth-surfaced material.

My device has great educational value in that in assembling vari-colored sectors and the representations of objects or artistic designs the child will not only acquire an accurate memory of the representations of various objects but will also acquire artistic skill in combination of colors to create the most desirable effects. By use of the device having vari-colored alphabetical letters made of a material having hairy surfaces the child will learn to combine the letters of words and thereby to spell.

My invention may be very satisfactorily employed in advertising display designs wherein representations of objects and letters combined to make any desired words may be quickly mounted on the background and removably held in desired position as long as desired.

I am aware that many changes may be made and numerous details of construction may be varied through a wide range without departing from the principles of this invention, and I therefore do not purpose limiting the patent granted hereon otherwise than necessitated by the appended claims.

I claim as my invention:

1. In an educational device, a rigid backing member; a porous and hair-surfaced material on said rigid member; a frame adapted to snugly receive said rigid member; projecting studs on the periphery of said frame and elastic means adapted to engage the projecting studs on opposite sides of said frame member and hold a plurality of hair-surfaced segments in position.

2. In an educational device, a rigid frame having studs or the like projecting from its periphery; an irregularly surfaced member in said frame; a porous hair-surfaced material secured on said member; and means removably engaging the studs on opposite sides of said rigid member and adapted to hold a plurality of hair-surfaced segments in contact with said material.

3. In an educational device, a rigid base member; a porous hair-surfaced material secured on said rigid member; a frame adapted to fit about said rigid member having studs or the like projecting from its periphery, and means removably engaging the studs on opposite sides of said frame and adapted to hold a plurality of hair-surfaced segments in assembled relation.

4. An article of the class described comprising a base member having a hairy surface; a frame adapted to receive said base member, and elastic means removably secured on said frame and adapted to hold a plurality of hair-surfaced pieces in engagement with said base member, and means on said frame to adjustably and removably lock said base member therein.

5. An article of the class described comprising a base member having a hairy surface; felt-surfaced pieces adapted to be placed on said base member and assembled to form object representations; a frame adapted to receive said base member; and cables on said frame adapted to hold said pieces in engagement with said base member, and an L-shaped member removably secured on the upper and outer sides of said frame adapted to hold said cables against said frame; and means for adjusting said segment holding means to exert varying degrees of pressure thereon.

6. A device of the class described comprising a base member having a hairy surface; a frame adapted to receive said base member; a plurality of cables stretched across said frame, means on said frame adapted to removably hold said cables in position, and means on said frame adapted to releasably lock said base in said frame.

7. In a device of the class described, a frame, a hair-surfaced member removably mounted in said frame; a plurality of strings stretched across said member and secured on said frame, and adapted to hold removably positioned segments adjacent said member.

8. In a device of the class described, a frame, a hair-surfaced member removably mounted in said frame; a plurality of strings stretched across said member and secured on said frame and adapted to hold removably positioned segments adjacent said member, and means in said frame for adjustably securing said member therein.

9. In a device of the class described, a frame; a rigid member in said frame having an irregular surface; means on said frame for releasably and adjustably securing said rigid member in said frame, and means stretched across said member and secured to said frame adapted to hold removably positioned segments adjacent said member.

10. In a device of the class described, a frame, an irregularly surfaced member in said frame; means for adjustably and removably securing said member in said frame; an elastic element stretched across said frame and removably secured thereon, and pieces of textile material positioned on said member, said elastic element holding said pieces in contact with said member.

11. A device of the character described comprising, in combination, a base member made of a material having outwardly extending tentacles, and a plurality of removable members formed of a material having such tentacles, said members being assembled with their adjacent edges in engagement and their marginal tentacles interlocked, one member with another, to form a composite character and said tentaches on said base member and said removable members being interlocked to cause said removable members to be held upon said base member.

12. A device of the character described comprising, in combination, a base formed of material having outwardly extending hair-like tentacles, and a plurality of flat cut-out pieces of relatively pliable material of various shapes provided with edge portions adapted to abutt, said cut-out pieces having hairy tentacles coextensive with their surfaces and of sufficient length whereby when said cut-outs are assembled flat on said base with certain adjacent edges in abutting relation there will be no substantial physical line of demarcation between them due to the pliability of the edge portions conforming to slight irregularities in the engaging edges of adjacent pieces and due to the interlocking of the marginal tentacles of abutting pieces and whereby the tentacles of the pieces and of the base will interlock each with the other detachably to hold them in assembled relation.

13. A device of the character described comprising, in combination, a base member made of material having outwardly extending tentacles, and a plurality of removable members formed of material having such tentacles extending from all surfaces thereof, certain of said members being assembled on said base with their adjacent edges in engagement and their tentacles interlocked one member with another, and another of said members being superposed upon and overlying the junction of said abuttingly assembled members with the tentacles of said superposed member interlocking with the tentacles of said abuttingly assembled members whereby to form a composite character of a plurality of layers detachably held on said base.

14. A device of the character described comprising in combination, a base made of material having relatively long hairy tentacles, and a plurality of flat, relatively pliable, cut out pieces of variant shapes, selected so as to be assembled upon the base with portions thereof interlocking with each other and with certain pieces superimposed to form upon the base selectable built-up representations of variant cross sectional thickness of objects well known to children, each of said pieces being formed of material having extending from opporite faces relatively long hairy tentacles whereby when assembled as above described the pieces and the base will be detachably interlocked to each other and to the base by such tentacles.

LAWRENCE J. BURKE.